United States Patent [19]
Malkin et al.

[11] Patent Number: 5,940,391
[45] Date of Patent: Aug. 17, 1999

[54] METHOD AND APPARATUS FOR RECONFIGURABLE AND ADAPTIVE STREAM MULTICAST

[75] Inventors: Peter Kenneth Malkin, Ardsley; Marc Hubert Willebeek-LeMair, Yorktown Heights; Philip Shi-Lung Yu, Chappaqua, all of N.Y.

[73] Assignee: International Business Machines Corporation, Armonk, N.Y.

[21] Appl. No.: 08/977,864

[22] Filed: Nov. 25, 1997

[51] Int. Cl.$^6$ ..................................................... H04L 12/18
[52] U.S. Cl. ........................... 370/390; 370/466; 370/486
[58] Field of Search ..................................... 370/408, 390, 370/401, 421, 420, 486, 487, 400, 466; 348/7, 8

[56] References Cited

U.S. PATENT DOCUMENTS

| | | |
|---|---|---|
| 5,355,371 | 10/1994 | Auerbach et al. . |
| 5,434,678 | 7/1995 | Abecassis . |
| 5,511,168 | 4/1996 | Perlman et al. . |
| 5,550,575 | 8/1996 | West et al. . |
| 5,577,032 | 11/1996 | Sone et al. . |
| 5,696,763 | 12/1997 | Gang, Jr. . |
| 5,787,083 | 7/1998 | Iwamoto et al. . |
| 5,850,396 | 12/1998 | Gilbert . |

OTHER PUBLICATIONS

N. Yeadon et al., "Continous media filters for heterogeneous internetworking", Proceedings of SPIE, MMCN, Jan. 1929–31, 1996, 12 pages.

*Primary Examiner*—Chau Nguyen
*Assistant Examiner*—Kenneth Vanderpuye
*Attorney, Agent, or Firm*—Ratner & Prestia

[57] ABSTRACT

A multimedia stream is multicasted. A request to perform the multicast is received. A plurality of distribution nodes are assigned to provide the multicast to a plurality of receivers. The assignment of a node is based on the transformation capabilities of that node. The multicast is then performed and the assigned node performs its transformation. The transformed multicast is distributed to a receiver which is suitable for receiving the transformed multicast.

20 Claims, 15 Drawing Sheets

MDN TABLE

| 405 | 407 | 409 |
|---|---|---|
| MDN ID | CAPACITY /CAPABILITY | SCHEDULE LIST |
|  |  |  |
|  |  |  |
|  |  |  |
|  |  |  |
|  |  |  |

FIG. 4A

MULITCAST SCHEDULE TABLE

| 420 | 421 | 422 | 423 | 424 | 425 |
|---|---|---|---|---|---|
| SESSION ID | START TIME | DURATION | MSN | SESSION INFORMATION | LIN B TO MIN TREE HIERARCHY |
|  |  |  |  |  |  |

FIG. 4B

MDN TREE HIERARCHY

MDN REQUEST HANDLER ROUTINE

MDN DATA STRUCTURE

SESSION TABLE 347

| SESSION ID 1310 | SESSION INFORMATION 1315 | START TIME 1320 | DURATION 1325 | MSN 1330 | TRANSFORMATION 1335 | MULTICAST LIST 1340 |
|---|---|---|---|---|---|---|
|  |  |  |  |  |  |  |
|  |  |  |  |  |  |  |
|  |  |  |  |  |  |  |
|  |  |  |  |  |  |  |

FIG. 12

METHOD AND APPARATUS FOR RECONFIGURABLE AND ADAPTIVE STREAM MULTICAST

FIELD OF THE INVENTION

The present invention relates in general to multicasting and more particularly to multicasting in a network environment. Specifically, a method and apparatus are described for performing multicasting with dynamic reconfiguration and adaptation based on client station capabilities.

BACKGROUND OF THE INVENTION

As Internet and Intranet become increasingly popular, various new applications are developed. One general concern on deploying new applications is the diversity of client station capabilities.

Multicasting or broadcasting of multimedia streams is an important Internet or Intranet application with growing interests. If the same multicast stream is intended to be received by numerous client stations, then it is desirable for the multicasting station to multicast the stream based on what can be received by client stations with the least capability.

To facilitate multicasting or broadcasting, there generally are intermediate distribution nodes, referred to as reflector nodes, which receive the multicast stream and then send the stream to the client stations or other distribution/reflector nodes. These distribution nodes can in fact form a distribution hierarchy.

The prior art includes various systems directed towards modifying the multimedia stream content based on user preference on content ratings. For example, U.S. Pat. No. 5,550,575, entitled Viewer Discretion Television Program Control System," issued Aug. 27, 1996 to West et al., provides both time and content controls for multiple and variable numbers of viewers. The controls are at the granularity of the entire video.

Still another example, U.S. Pat. No. 5,434,678, Seamless Transmission of Non-Sequential Video Segments, issued Jul. 18, 1995, to Abecassis, is directed to the selective retrieval and seamless transmission of non-sequentially stored video segments of a variable content video program, responsive to a viewers pre established video content preferences. Here, video segments from a single source can be selected by applying video content preferences to a video segment map. With this approach it is desirable to generate the variable content video program and to obtain the participation of the broadcaster, if it is to be effective.

These approaches either rely on the multicast source to generate multiple streams for different content specifications, or the user and the intermediate proxy or distribution nodes to apply proper filtering on the content of a multicast stream. The client receiving capability has not been taken into consideration and the network configuration or the multicast path is not dynamically changed, i.e. it does not get reconfigured on a session basis to address the particular requirement of each multicast session.

SUMMARY OF THE INVENTION

A multimedia stream is multicasted. A request to perform the multicast is received. A plurality of distribution nodes are assigned to provide the multicast to a plurality of receivers. The assignment of a node is based on the transformation capabilities of that node. The multicast is then performed and the assigned node performs its transformation. The transformed multicast is distributed to a receiver which is suitable for receiving the transformed multicast.

BRIEF DESCRIPTION OF THE DRAWINGS

FIG. 4(a) is an exemplary table which is used for tracking distribution node usage.

FIG. 4(b) is an exemplary table which is used for tracking multicasts.

FIG. 12 is an exemplary table which maintains data relating to each multicast session and which is maintained by the distribution node in accordance with an exemplary embodiment of the present invention.

DETAILED DESCRIPTION OF THE INVENTION

Figure 1:
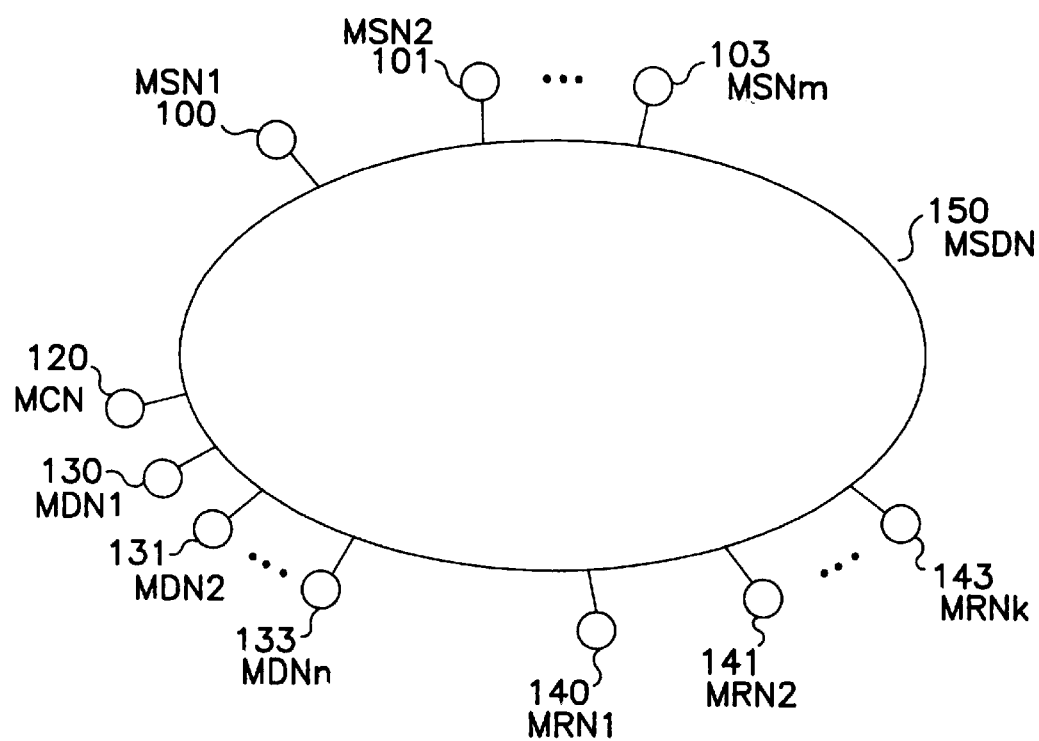
FIG. 1 is a diagram of an exemplary Internet environment in which various aspects of the present invention may be implemented.

FIG. 1 depicts an example of an Internet environment in accordance with an exemplary embodiment of the present invention. Multicast Source Nodes (MSN) 100, 101, 103 are multicast sources which provide, for example, respective multimedia streams. Multimedia Receiver Nodes (MRN) 140, 141, 143 each receive multimedia streams. MRN 140, 141, 143 are heterogeneous ranging from wristwatches, to palm-tops, to desktop PCs or set-top boxes. MRN 140, 141, 143 also range in capabilities (e.g. network connectivity, processing speed, memory, etc.).

Multimedia Distribution Nodes 130, 131, 133 replicate, transform and facilitate the transmission of multimedia streams from MSN 100, 101, 103 to MRN 140, 141, 143. Dynamic multimedia stream distribution network (MSDN) 150 enables MSN 100, 101, 103 to enter and leave the Internet environment dynamically and to simultaneously multicast their contents to multiple receiver nodes MRN 140, 141, 143 through MDN 130, 131, 133. Multimedia Controller Node (MCN) 120 manages, configures, and controls MDN 130, 131, 133 and determines connectivity between the MSN 100, 101, 103, MRN 140, 141, 143 and MDN 130, 131, 133.

The characteristics of each multicast may be different. For example, some multicasts may be a high bit rate video to provide high resolution. Other multicasts may be low bit rate video. Multiple resolution video streams may also be used for multicasts. Some multicasts may be audio only.

MDN 130, 131, 133 have two functions, a) to distribute the streams and b) to transform the streams for suitable delivery to MRN 140, 141, 143. For each multicast session, depending on the characteristics of the multicast stream and the capabilities of MRN 140, 141, 143 which are participating, MCN 120 configures an appropriate subset of MDN 130, 131, 133 to support each multicast session. Logically, MDN 130, 131, 133 which are participating in each multicast session form a tree hierarchy referred to as the MDN tree hierarchy of the multicast session. This is discussed in greater detail with reference to FIG. 2.

MCN 120 is aware of each MDN 130 131, 133 coupled to network 150. MDN 130, 131, 133 may be geographically dispersed and may register different capabilities. However, these capabilities may be dynamically configurable. MDN 130, for example, may be capable of serving up to N number of streams of bandwidth y, or M streams at bandwidth x. MDN 130 may also be able to convert a stream of bandwidth x to y but then only serve P streams. Thus, the function and capacity of MDN 130 may be programmed dynamically to serve a particular need. Hence, MDN 130, 131, 133 register their capabilities with MCN 120 and MCN 120 relays configuration information down to MDN 130, 131,133 at any given time to accommodate a new multicast or broadcast session.

In accordance with an exemplary embodiment of the present invention, the process is as follows. MSN 100 (for example) registers with MCN 120 to transmit a multicast at a specific time. MCN 120 then configures a set of one or more MDN 130, 131, 133 (i.e. the MDN tree hierarchy) to carry and distribute the multicast. This MDN tree hierarchy configuration is based on anticipated MRN demographics participating in the multicast. As MRN 140, 141, 143 connect to the multicast they go through MCN 120 which assigns them to a particular MDN 130, 131, 133 depending on their location and capabilities and the MDN capacity. If the actual number of MRNs which register for the multicast session exceeds the anticipated capacity, then new MDNs may be added to the multicast, i.e. MCN 120 expands the MDN tree hierarchy with additional MDNs. Similarly, if there is a capability mismatch (e.g. high bit rate vs. low bit rate) between the actual registered MRNs and anticipated MRNs, new MDNs may be added to the multicast session to accommodate the different MRN capability requirement.

According to an exemplary embodiment of the present invention, client capability information can be efficiently communicated between MRN 140, 141,143, and MCN 120 using piggybacked meta data. In a HTTP implementation, for example, the information exchange can be included as meta data in an object header using existing Web protocols. The Platform for Internet Content Selection (PICS) protocol specifies a method of sending meta-information concerning electronic content. PICS is a Web Consortium Protocol recommendation (see http://www.w3.org/PICS). PICS was first used for sending values-based rating labels (e.g. degrees of nudity, profanity, violence) but the format and meaning of the meta-information is fully general. In PICS, meta-information about electronic content is grouped according to the "rating service" or producer-and-intended-usage of the information, and within one such group, any number of categories or dimensions of information may be transmitted. Each category has a range of permitted values, and for a specific piece of content, a particular category may have a single value or multiple values. In addition, the meta-information group (known as a "PICS label") may contain expiration information. There are also facilities for permitting a PICS label to apply to more than one piece of electronic content. Each PICS label for a specific piece of electronic content may be added or removed from the content independently.

For example, an image file may be sent from a server with a PICS label whose "rating service" field indicates it contains values-based rating labels according to the SafeSurf rating system. According to an exemplary embodiment of the present invention, as the image file passes through an enterprise proxy, the file may be processed or updated with a new category value for the PICS label to reflect the current content according to the rating service. Thus, the client computer sees the updated category value of the PICS label (instead of the original category value). The HTTP protocol has been augmented with request headers and response headers that support PICS. A sample PICS label is: (PICS-1.1 "http://the.rating.service" label for "http://the.content" exp "1997.07.01T08:15-0500" r (n 4 s 3 v 2 1 0)) where the 'n' 's' 'v' '1' are transmit names for various meta-information types, and the applicable values for this content are 4 (for n), 3 (for s), 2 (for v) and 0 (for 1). Software which recognizes the ID "http://the.rating.service" would desirably know how to interpret these categories and values.

In the preferred embodiment, a PICS label to indicate the capability of MRN 140, 141, 143 is introduced. This is referred to as a capability label (C-label) to inform MCN 120 of the capability of MRN 140, 141, 143 during session registration. It can include, but is not limited to, any combination of the following categories:

Bandwidth category: the highest bit rate MRN 140, 141, 143 can receive;

Video capability category: indicating whether MRN 140, 141, 143 can perform MPEG decoding;

Similarly, the capacity/capability of MDN 130, 131, 133 can be conveyed to MCN 120 using the PICS protocol.

The MDN tree hierarchy can be different for different multicast sessions as different sessions can have different numbers and types of MRNs participating where the characteristics of the multicast streams can also be different. For example, MSN 100, 101, 103 can transmit separate audio and video streams/channels during multicast and MDN 130, 131, 133 can multicast one of the streams/channels based on the aggregate client station capability. Potentially a different multicast path in the MDN tree hierarchy can be used for each group of client stations with distinct capability. MSN 100, 101, 103 can also transmit multiple audio tracks or multiple resolution videos to allow MDN 130, 131, 133 to make the appropriate selection or transformation based on the capability of MRN 140, 141, 143. Generally speaking, the stream transmission at the content server can consist of multiple decomposable and additive components or tracks. MDN 130, 131, 133 can select the appropriate components based on the aggregate client station capability to compose the multicast stream.

MDN 130, 131, 133 can perform various transformations on the multicast stream to suit the requirement of the MRN 140, 141, 143. For example, if a multiple resolution encoding video stream is transmitted by MSN 100, 101, 103, the MDN tree hierarchy can be configured to provide a path to multicast low resolution encoding video streams to a group of low video capability MRNs and another path to multicast high resolution encoding video streams to a group of high video capability MRNs. That is to say MDN 130, 131, 133 can be configured to provide a different multicast path for each MRN group with distinct capability so the appropriate resolution video can be transmitted to each MRN group. If MSN 100 can transmit multiple audio tracks, MDN 130 can be configured to multicast audio stream based on the aggregate client station capability using a different multicast path. In another example, assume MSN 100 is multicasting an MPEG encoded video stream. If some of the MRNs are thin client stations with little processing capability to decode the MPEG stream, it would be desirable for these MRNs to be put onto a multicast path where the MDN would decode the MPEG stream and multicast the decoded stream to those MRNs. Those skilled in the art will appreciate that there are many other different kinds of transformations which may be applied to a multicast stream to suite the different capabilities and requirements of MRN 140, 141, 143.

Figure 2C:
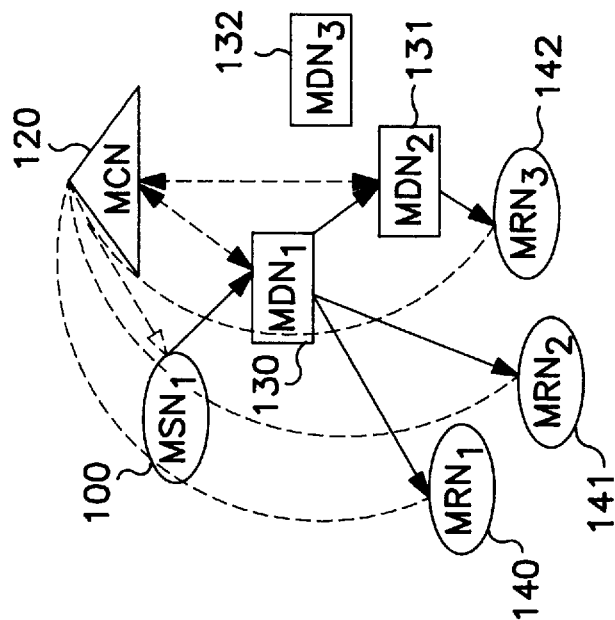
FIGS. 2(a)–(c) are illustrations of an exemplary Multimedia Distribution Node tree hierarchy.
Figure 2B:
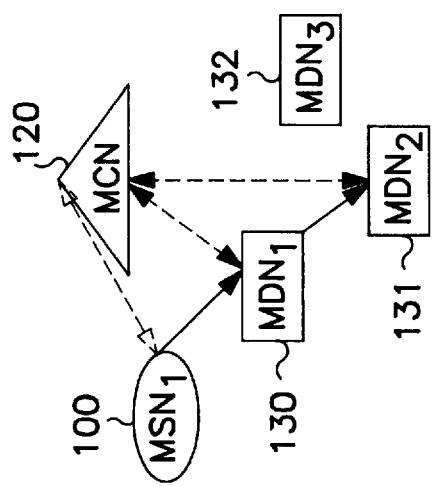
Figure 2A:
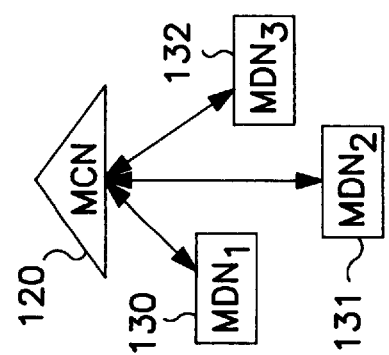

An illustrative example now follows with reference to FIGS. 2(a), 2(b) and 2(c). These figures depict how an MDN tree hierarchy is formed for a multicast session. FIG. 2(a) includes MCN 120 with MDN1 130, MDN2 131 and MDN3 132.

MCN 120 initiates the use of each MDN 130, 131, 133 and collects capability information from each MDN. In this example MDN2 reports that it has the capability to transcode an MPEG video stream to a low bit-rate H.263 stream. In this example, the transcode indicates a transformation from one compression to another. The other two MDNs simply have distribution/reflector capability with a certain stream limit and bandwidth limit.

A sample MDN capability list is as follows:
MAX_STREAM_COUNT=200;
MAX_THROUGHPUT=16 Mbps;
TRANSCODE(H.263 to MPEG);
TRANSCODE(MPEG to H.263);
ARCHIVE_LIMIT=3 Gbytes;
where the MAX_STREAM_COUNT represents the maximum number of concurrent streams and MAX_THROUGHPUT is the maximum bit rate that an MDN can support. TRANSCODE field indicates the transformation supportable by the MDN. For example, TRANSCODE (H.263 to MPEG) means that the MDN can support the transformation of H.263 to MPEG, while TRANSCODE (MPEG to H.263) means MDN 130, 131, 133 can also support the transformation of MPEG into H.263. ARCHIVE_LIMIT shows the storage limitation of the MDN for archiving the stream data in a session.

When a source, MSN1 100, contacts MCN 120 to establish a multimedia session (as shown in FIG. 2(b)), it requests to transmit an MPEG stream and to also provide a low bit-rate version of the stream for receivers connecting over low bit-rate modem connections.

Consider a sample MSN Request:
DATE=Feb. 23, 1998;
TIME=14:00;
DURATION=1 Hr;
TYPE=MPEG;
TARGET_STREAMS=1000;
TRANSCODE(H.263);
TARGET_STREAMS=100;
where the DATE and TIME fields give the start time (2:00 PM, Feb. 28, 1998) and DURATION provides the length of the multicast session. The TYPE field indicates the transmission format which is MPEG, where the following TARGET_STREAMS field indicates the estimated number of MRNs receiving the multicast in the MPEG format (to be 1000). The TRANSCODE field indicates the desire of the MSN to allow for transformation (by the MDNs) of the stream into H.263, where the following TARGET_STREAMS field indicates the estimated number of MRNs receiving the multicast in the H.263 format (to be 100).

FIG. 2(b) depicts that when MSN1 100 registers for a multicast session, MCN 120 configures an MDN tree hierarchy consisting of MDN1 130 and MDN2 131, where MDN1 130 is the root of the MDN tree hierarchy, i.e. the primary distribution node. MCN 120 designates MDN2 131 as a secondary node and configures it to transcode the incoming MPEG stream to the low bit-rate H.263.

The distribution goes live at 2:00 pm on Feb. 23, 1998. At this time, when a client (e.g., MRN1 140) contacts MCN 120 (via a browser window, by clicling on the event URL) to connect to a particular multicast, MCN 120 examines the clients capabilities (via PICS) and dynamically points the MRN to the appropriate MDN. FIG. 2(c) depicts the MRN assignment. In this example MRN1 140 has MPEG capability and is pointed to MDN1 130. The same transaction occurs for MRN2 141. MRN3 143, however, upon contacting the MCN 120 indicates (via PICS) that it does not have MPEG capability, but does have H.263 capability. In this case, the MCN 120 points MRN3 143 to MDN2 131 so that it can receive the H.263 transcoded version of the multicast.

Figure 3:
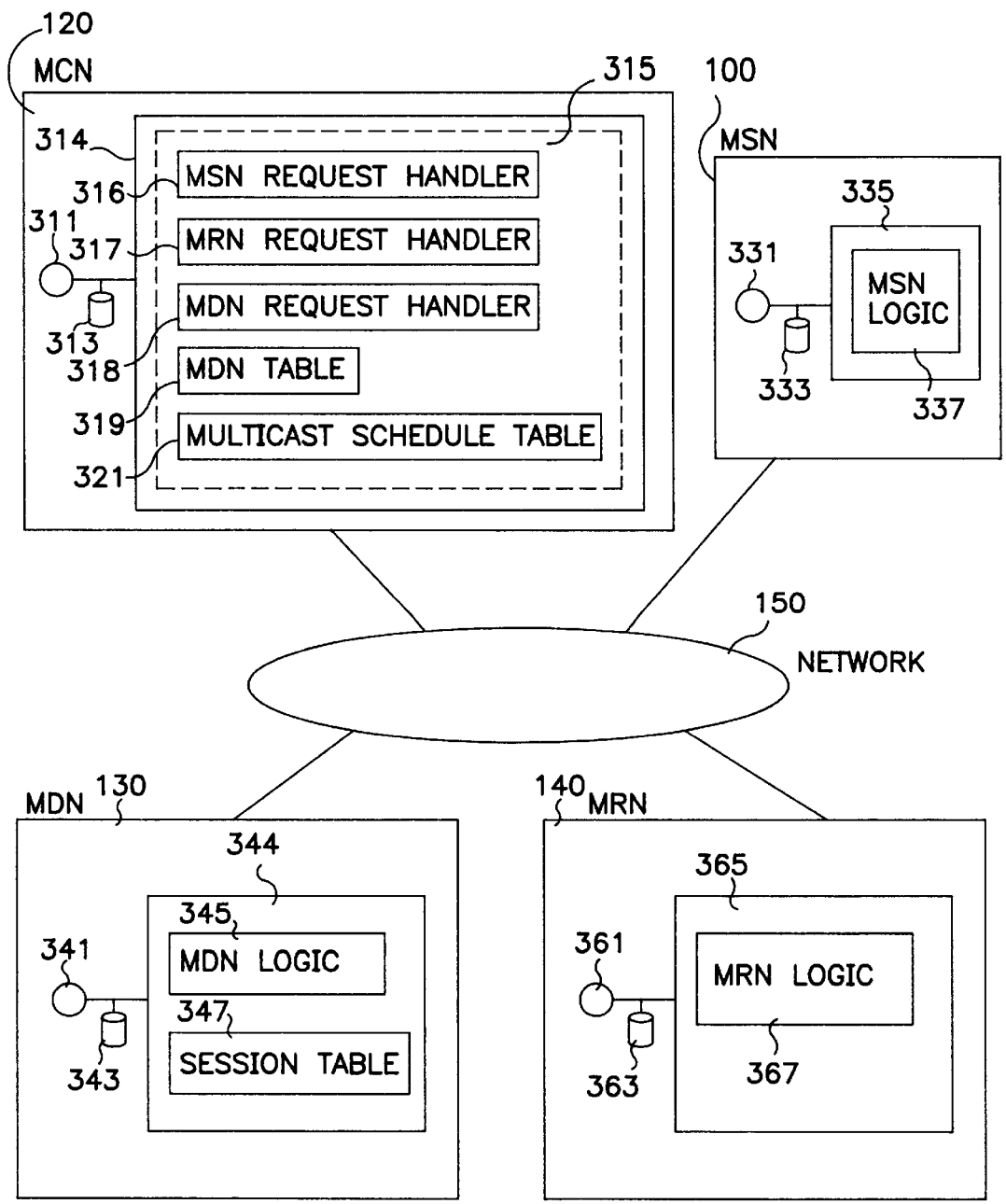
FIG. 3 is a block diagram of a control node, a source node, a distribution node and a receiver node coupled to a network in accordance with an exemplary embodiment of the present invention.

FIG. 3 is a block diagram illustrating an exemplary embodiment of the present invention. In this illustrative example, MRN 140 is a conventional workstation, PC, a set-top box, palm-tops or wristwatches. MRN 140 can receive multicast via the network 150 for multimedia content. MRN 140 preferably includes CPU 361, memory 365 such as RAM, and storage devices 363 such as DASD. Memory 365 includes MRN logic 367 which is described in further detail with reference to FIG. 10. In an exemplary embodiment of the present invention, MRN logic is preferably embodied as computer executable code which is loaded from remote (over the network) or local permanent optical (CD-ROM) or magnetic storage such as disk, or DASD 363 into memory 365 for execution by CPU 361.

An MSN node (e.g. 100) can be any conventional computing node that can provide multimedia content through network 150. As shown in FIG. 3, MSN 100 preferably includes CPU 331, memory 335 such as RAM, and storage devices 333 such as DASD. Memory 335 stores the MSN logic 337 (discussed in more detail with reference to FIG.

14) preferably embodied as computer executable code which is loaded from DASD 333 into memory 335 for execution by CPU 331.

MDN 130 preferably includes CPU 341, memory 344 such as RAM, and storage devices 343 such as DASD. Memory 344 stores MDN logic 345 (discussed in more detail with reference to FIG. 13) preferably embodied as computer executable code which is loaded from DASD 343 into memory 344 for execution by CPU 341. MDN 130 also stores session table 347 (discussed in more detail with reference to FIG. 12).

MCN 120 preferably includes CPU 311, memory 314 such as RAM, and storage devices such as a disk or DASD 313. According to the present invention, MCN logic 315 (as will be discussed in more detail with reference to FIG. 5) preferably embodied as computer executable code, is loaded from remote (over the network) or local permanent optical (CD-ROM) or magnetic storage such as disk, or DASD 313 into memory 314 for execution by CPU 311. MCN logic 315 preferably includes MSN request handler 316 (discussed in more detail with reference to FIG. 6), MRN request handler 317 (discussed in more detail with reference to FIG. 8) and MDN request handler 318 (discussed in more detail with reference to FIG. 9). MCN 120 also maintains MDN table 319 and multicast schedule table 321. These tables are discussed in more detail with reference to FIGS. 4(a)–4(e).

MCN 120, MDN 130, 131, 133, or MSN 100, 101, 103 can run on any computing node, which includes, but is not limited to, products such as are sold by IBM under the trademarks S/390 SYSPLEX, SP2, or RS6000 workstations.

In accordance with an exemplary embodiment of the present invention, MCN 120 maintains MDN table 319 and multicast schedule table 321. MDN table 319 maintains information regarding (for example) each distributed node which is coupled to network 150. An exemplary MDN table 319 is illustrated in FIG. 4(a). Each entry in MDN table 319 desirably consists of several fields, including MDN ID 405, capacity/capability field 407 for each respective distributed node and schedule list field 409 for each respective distributed node. MDN ID 405 uniquely identifies the MDN, e.g. its Internet Protocol (IP) address. Each MDN 130–133 registers its respective capabilities with MCN 120 when the MDN is started (see step 1220 in FIG. 13). Capacity/capability field 407 can contain information such as MDN processing power, I/O bandwidth, memory, and any other specialized functions (e.g., MPEG hardware support, Tiger Shark file system, etc.). This information is provided during MDN registration. The MDN may also register specific requests such as source access (i.e. which MSN are allowed or not allowed to use this MDN) and security requirements to be included in capacity/capability field 407. Schedule list 409 indicates the future sessions in which this MDN is participating. These sessions are further described in the multicast schedule table 321 which is described in detail with reference to FIG. 4(b). When a MDN is assigned to a multicast session (as part of the MDN tree hierarchy), its schedule list 409 is updated.

An MSN needs to register with MCN 120 to start a multicast session, specifying the start time, duration, characteristics of the multicast stream, transform version requests (i.e. the different transformations applicable to the multicast stream by the MDNs), and other information such as anticipated audience size and demographics or specific audience authentication requirements. MCN 120 assigns a primary MDN to receive the MSN stream, and potentially other MDNs to handle transforms or for load balancing purposes. These MDNs form a tree hierarchy. For each multicast session, MCN 120 needs to configure a MDN tree hierarchy to support the multicast based on the specific session characteristic of the multicast stream specified by the MSN registration request. Different multicast sessions may employ a different set of MDNs and have a different MDN tree hierarchy structure.

Figure 4C:
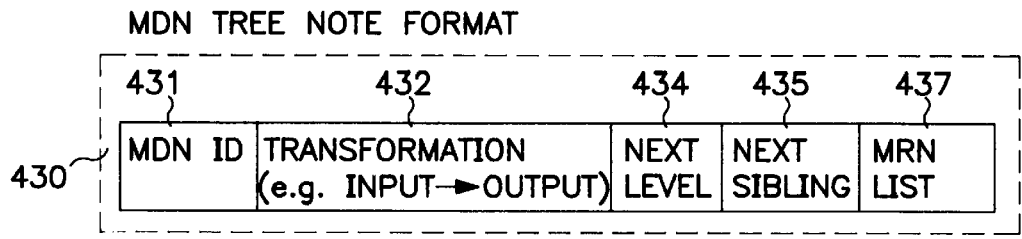
FIG. 4(c) illustrates tree node format in order to build a distribution node tree hierarchy.

In the multicast schedule table 321, each entry consists of several fields including a session ID 420, start time of the session 421, its duration 422, MSN ID of the multicast source 423, specific session information 424 and link field 425 pointing to the MDN tree hierarchy used in this multicast session to be described in detail in FIG. 4(c). Session ID 420 is assigned by MCN 120 during registration. Session information 424 is given in the MSN registration request, including (but not limited to) the characteristics of the multicast stream, transform version requests, and other information like anticipated audience size or specific audience authentication requirements. Based on the session information, MCN 120 constructs a MDN tree hierarchy and updates the MDN tree hierarchy link field 425 to point to the MDN tree hierarchy.

Figure 4D:
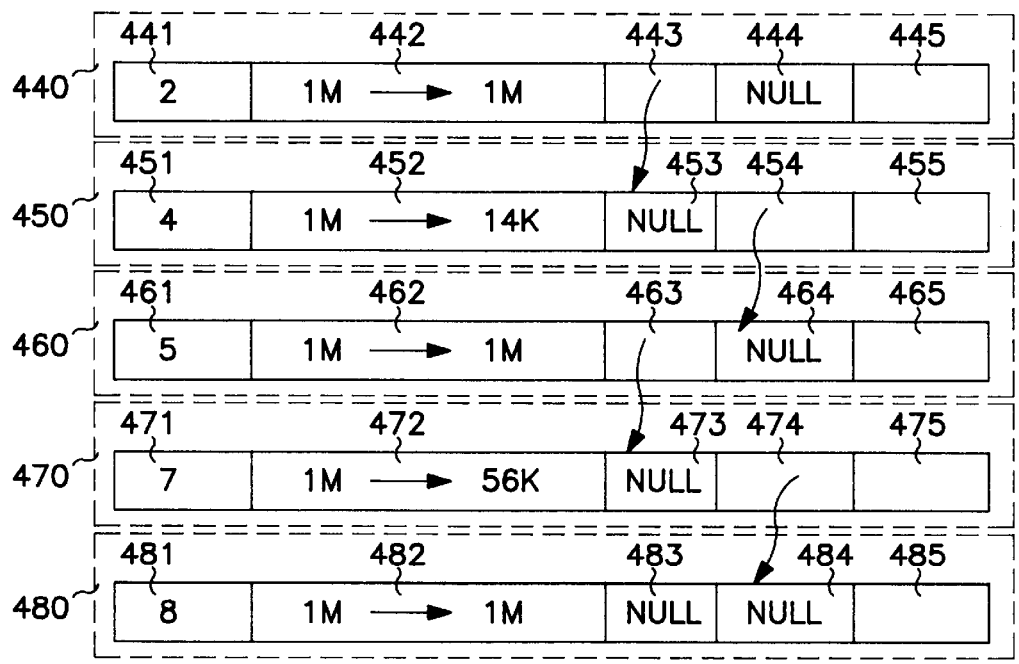
FIG. 4(d) provides an exemplary data structure representation of distribution node tree hierarchy.
Figure 4E:
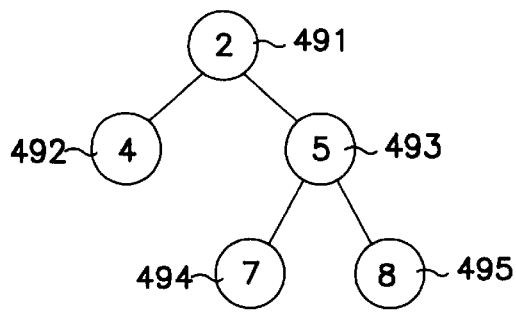
FIG. 4(e) illustrates an exemplary distribution node tree hierarchy in accordance with the data structure representation illustrated by FIG. 4(d).

FIG. 4(c) depicts an example of the node format in the MDN tree hierarchy representation. Each tree node 430 can consist of several fields including MDN ID field 431, transformation field 432, next level field 434, next sibling field 435 and MRN list field 437. MDN ID field 431 identifies the MDN. Transformation field 432 specifies what kind of transformation the MDN needs to perform. An exemplary transformation is a bit rate transformation from high-bit rate multicast to low-bit rate multicast. In this case, one can specify the input rate and the output rate of each MDN in the transformation field. Next level field 434 specifies its leftmost child node in the MDN tree hierarchy of this multicast. Next sibling field 435 specifies the next sibling node to the right in the MDN tree hierarchy of this multicast. MRN list field 437 provides the list of MRNs to receive the multicast from this MDN. FIG. 4(d) provides an exemplary data structure representation of the MDN tree hierarchy given in FIG. 4(e), where MDN2 is the primary MDN (i.e. the root node of the MDN tree) with two child nodes, MDN4 and MDN5, and MDN5 has two child nodes, MDN7 and MDN8. Furthermore, MDN4 is assigned to handle MRNs with a bit rate of 14K b/sec and MDN7 handles MRNs with a bit rate of 56K b/sec. The other MRNs handle a high bit rate of 1M b/sec. In FIG. 4(d), each of these MDNs is represented by a tree node record described in the format given in FIG. 4(c). For example, MDN2 is represented by node record 440. Its transformation field 442 indicates that both input and output streams are of 1M b/sec, i.e. no transformation is needed. Its next level field 443 links to record 450 of MDN4. Since MDN2 has no sibling, its next sibling field 444 is null. For MDN4, its transformation field indicates that while the input stream is 1M b/sec, the output stream is only 14K b/sec. MDN2 desirably performs a conversion from high bit rate stream to low bit rate stream to satisfy the MRN requirement. Its next sibling field 454 points to MDN5, while its next level field 453 is null. For MDN5, its next level field 463 points to MDN7 while its next sibling field 464 is null. No transformation is needed as indicated from the transformation field 462. For MDN7, its next sibling field 474 points to MDN8, while its next level field 473 is null. As indicated in its transformation field 472, MDN7 desirably performs a conversion from high bit rate stream of 1M b/sec to a low bit rate stream of 56K b/sec to satisfy the MRN requirement. For MDN8, both the next level field 483 and the next sibling field 484 are null. No transformation is needed as indicated from the transformation field 482. The MRN list fields 445, 455, 465, 475 and 485 are null when the MDN tree hierarchy are first constructed during MSN registration. They are filled up later on by the MCN 120 when MRNs request to join the multicast session and gets assigned to one of the MDNs. For example, if MRN1 140 requests to join the multicast session and gets assigned to MDN4, its ID is added to the MRN list field 455) of the node record of MDN4.

Figure 5:
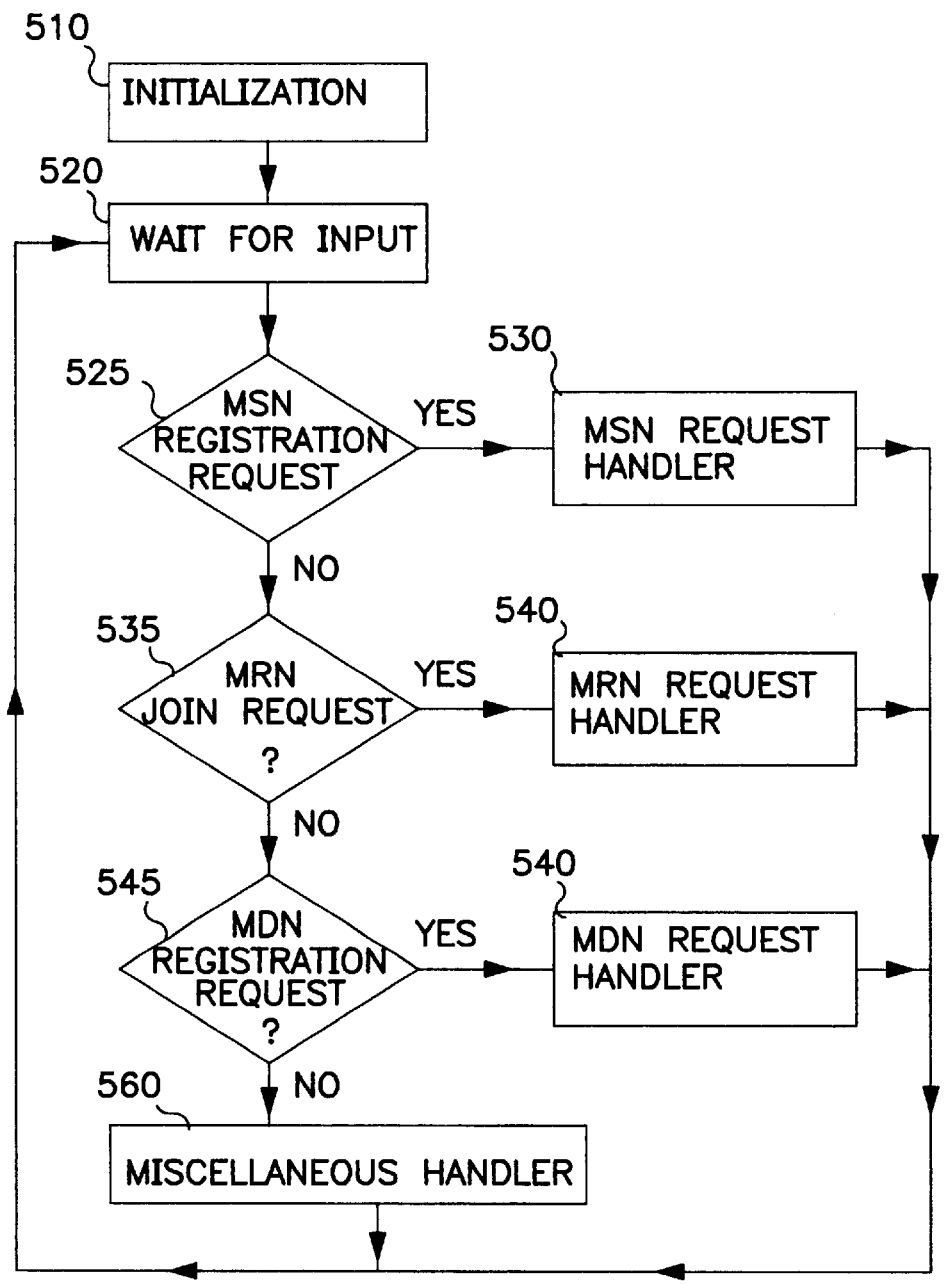
FIG. 5 is a flow chart diagram which illustrates the operation of a control node in accordance with an exemplary embodiment of the present invention.

FIG. 5 is a flow chart diagram which illustrates the operation of a control node in accordance with an exemplary embodiment of the present invention. As depicted, at step 510, the MCN is initialized to start up the MCN logic. During initialization, MCN initiates execution of a pre-given list of MDNs. At step 520, MCN waits for input. At step 525, depending upon the input received, different actions are taken. If the input received is an MSN registration request to schedule a multicast session, at step 530 the MSN request handler is invoked. A detailed example of the MSN request handler is described with reference to FIG. 6. At step 535, if the input received is an MRN join request to receive a scheduled multicast, at step 540 the MRN request handler is invoked. A detailed example of the MRN request handler is described with reference to FIG. 8. At step 545, if the input received is an MDN registration request, at step 550 the MDN request handler is invoked. A detailed example of the MDN request handler is described with reference to FIG. 9. At step 560, the miscellaneous handler is invoked to handle other type of inputs such as FTP requests.

Figure 6:
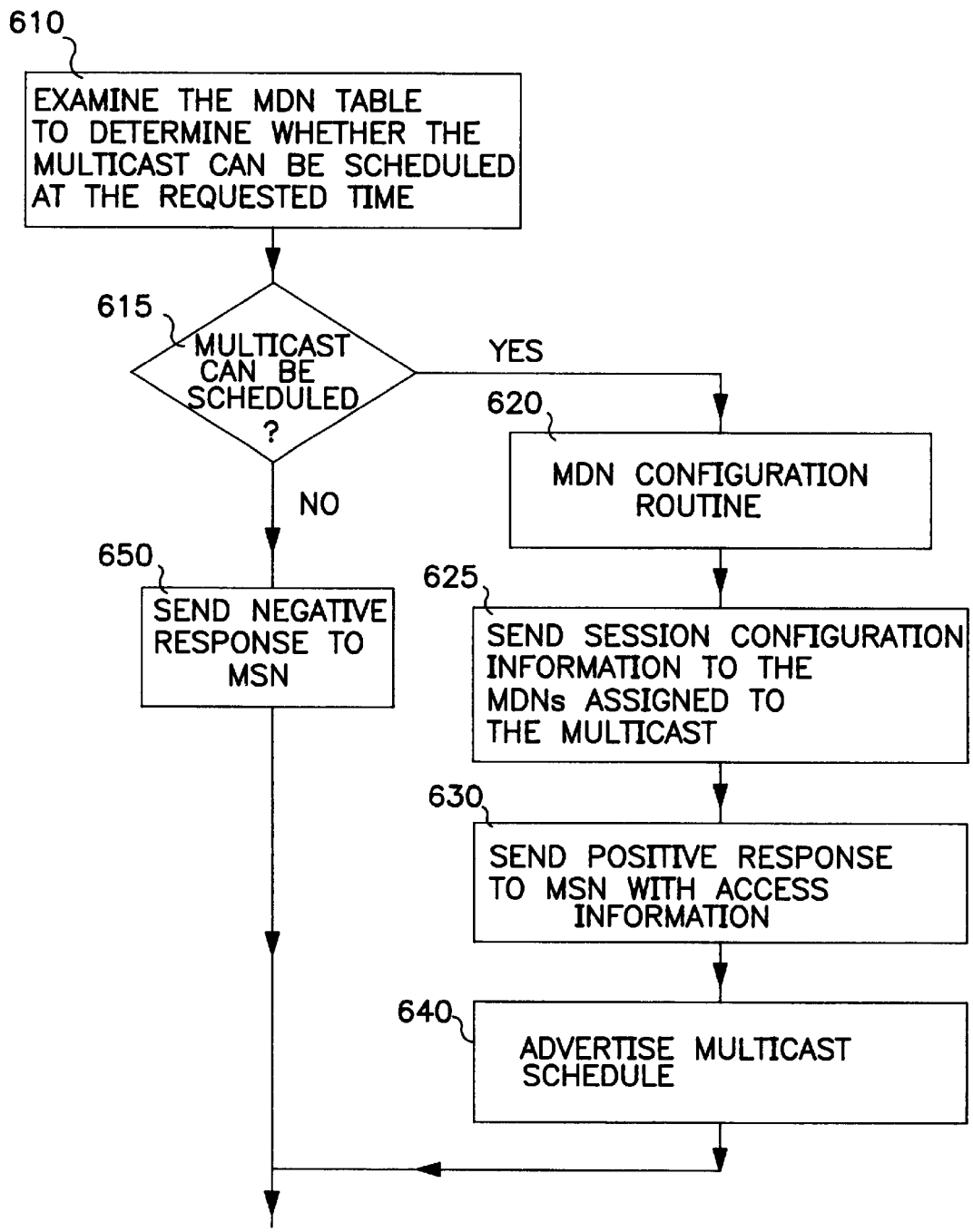
FIG. 6 is a flow chart diagram which illustrates the operation of a source node request handler within the control node in accordance with an exemplary embodiment of the present invention.

FIG. 6 is a flow chart diagram which illustrates the operation of a source node request handler within the control node in accordance with an exemplary embodiment of the present invention. The SN registration request specifies the start time, duration, characteristics of the multicast stream, transform version requests, and other information like anticipated audience size or specific audience authentication requirements. At step 610, MSN examines MDN table 318 to determine whether there is sufficient MDN capacity available at the requested time to schedule the multicast. At step 615, if the multicast can be scheduled, the MDN configuration routine is invoked to configure a MDN tree hierarchy to support the multicast session. A detailed example of the MDN configuration routine is described with reference to FIG. 7. At step 625, MCN 120 sends the session configuration information to the MDNs assigned to the multicast session. The session configuration information includes the MDN tree hierarchy information described with reference to FIG. 4(a)–4(e). The session configuration information provides each MDN with information on the transformation requested to be performed, child nodes, etc. At step 630, MCN 120 sends a positive response to the MSN requesting the multicast to indicate the multicast can be scheduled with the access information which includes the primary MDN for the multicast. At step 640, MCN 120 then advertises the scheduled multicast to all MRNs so they can join the multicast session. At step 650, a negative response is sent to the MSN indicating that the requested multicast cannot be scheduled at the requested time.

Figure 7:
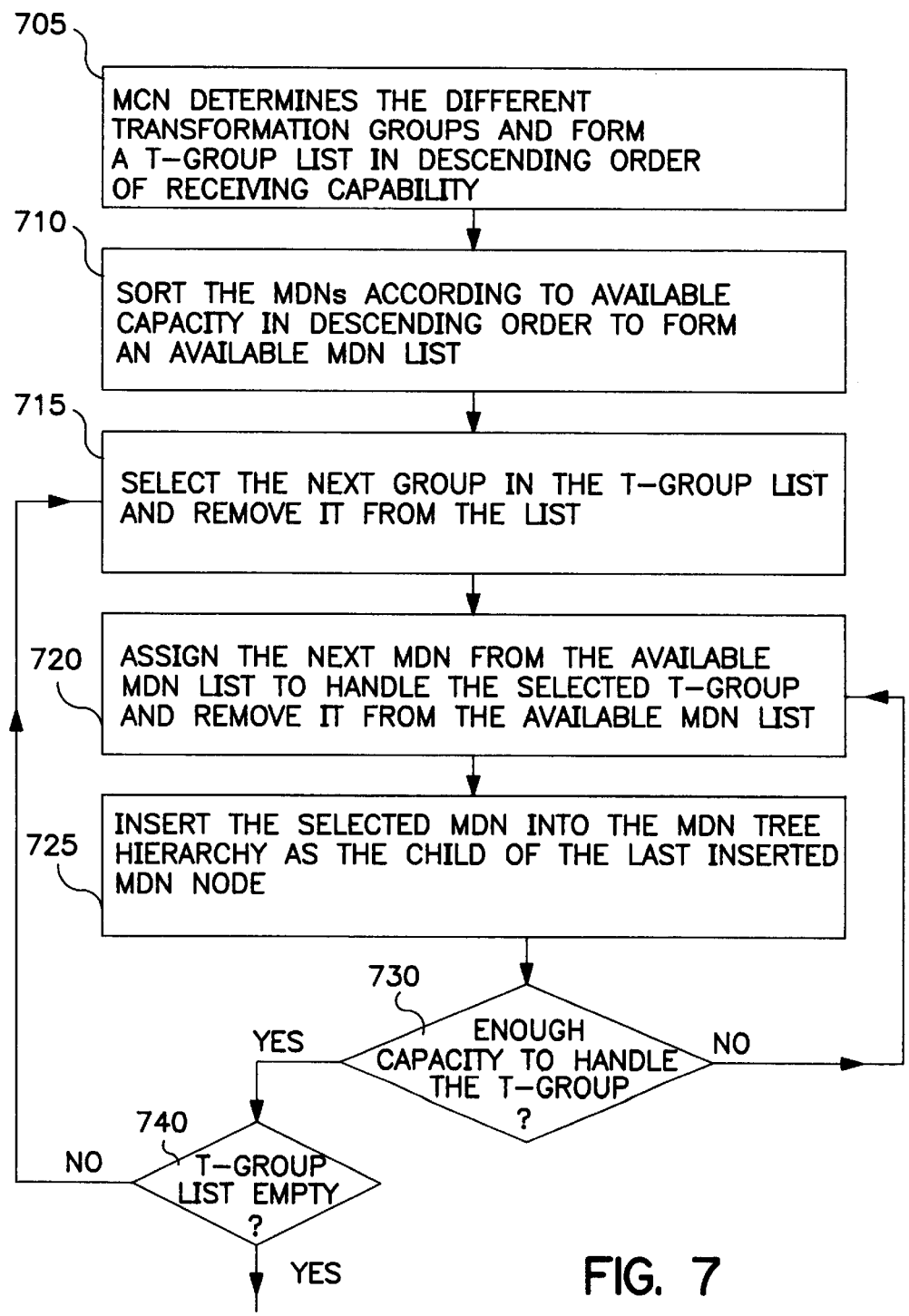
FIG. 7 is a flow chart diagram which illustrates the operation of a distribution node configuration routine in accordance with FIG. 6.

FIG. 7 is a flow chart diagram which illustrates operation of a distribution node configuration routine in accordance with FIG. 6. At step 705, MCN 120 aggregates MRNs into different transformation groups (referred to as T-groups) based on their capabilities. Specifically, MCN 120 determines the different transformation groups required to support the various MRNs for this multicast session based on the MSN registration request. MCN 120 sorts the transformation groups in descending order of capability to form a T-group list. In step 710, the MDNs are sorted according to their available capacity at the requested schedule time in descending order to form an available MDN list. At step 715, MCN 120 selects the next group on the T-group list and removes it from that list. At step 720, MCN assigns the next MDN on the available MDN list to handle the estimated MRN load of the selected T-group. At 725, this selected MDN is added to the MDN tree hierarchy as the child node of the last inserted MDN node. At step 730, it is checked whether the MDNs assigned to the T-group so far has sufficient capacity to handle the load of the T-group. If not, step 720 is repeated to assign an additional MDN to support the T-group. At step 740, it is checked whether the T-group list is empty. If not, step 715 is invoked again to handle the next T-group on the list.

For example, for a multicast of multiple resolution encoding video, assume that the MRNs can be grouped into three T-groups according to their receiving capabilities. The three T-groups are of 1M b/sec, 56K b/sec and 28K b/sec. The T-group list will have three groups in the order of 1M b/sec, 56K b/sec and 28K b/sec. Furthermore, assume that there are four available MDNs: MDN1, MDN2, MDN3 and MDN4, in decreasing capacity. According to the MDN configuration routine in the preferred embodiment, MDN1 is assigned to process the 1M b/sec T-group. MDN1 is then the root of the MDN tree hierarchy. Assuming MDN1 has sufficient capacity to handle the 1M b/sec group, MDN2 is assigned to handle the 56K b/sec T-group. In the MDN tree hierarchy, MDN2 becomes the child node of MDN1. If MDN2 does not have enough capacity to handle the 56K b/sec group, MDN3 is also assigned to handle that T-group. In the MDN tree hierarchy, MDN3 is now the child node of MDN2. If these two MDNs together can have enough capacity to handle the 56K b/sec T-group, MDN4 is assigned to handle the 28K b/sec T-group. In the MDN tree hierarchy, MDN4 becomes the child node of MDN3. Assuming MDN4 has sufficient capacity to handle the 28K b/sec group, the MDK tree hierarchy is completed with the 4 MDNs.

Those skilled in the art will appreciate that there are many other different ways to configure the MDN tree hierarchy. For example, when additional MDNs are required to handle a specific T-group, the newly added MDN can be made a sibling of the last MDN assigned to T-group instead of its child node as in FIG. 7. Furthermore, each MDN has previously been described as handling one type of T-group. In an alternative embodiment of the present invention, an MDN may handle multiple T-group as long as it has the capacity. At step 720, the MDN is not removed from the available MDN list unless its capacity is used up by the latest T-group assigned. In an exemplary embodiment of the present invention, MDN assignment is made based upon load balancing. Alternatively, MDN assignment can be based upon geographic factors. The T-group can be further partitioned based on geographical locations and the MDN assignment can take geographical location into consideration so as to reduce the distance between MDNs and MRNs.

Figure 8:
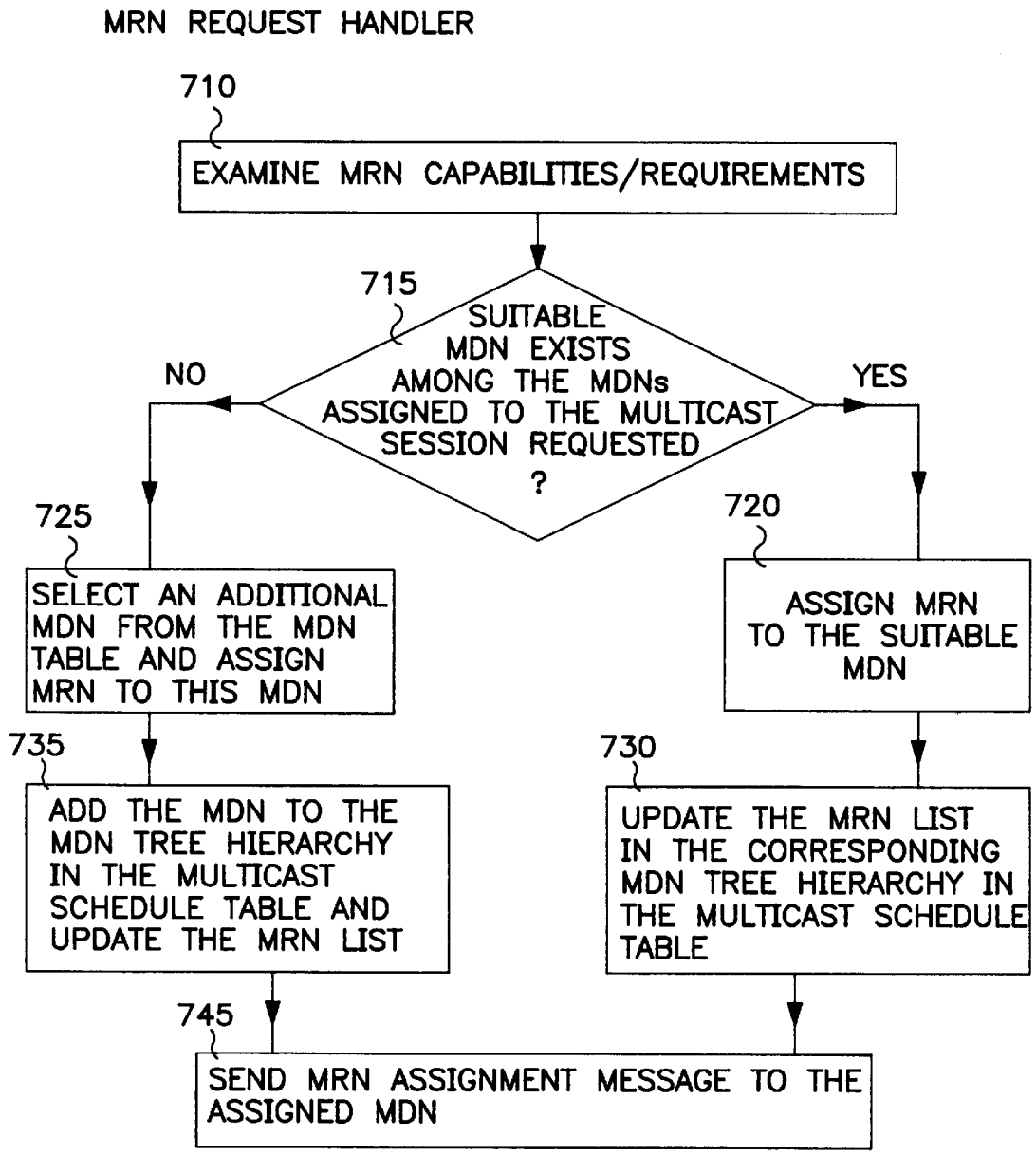
FIG. 8 is a flow chart diagram which illustrates the operation of a receiver node request handler within the control node in accordance with an exemplary embodiment of the present invention.

FIG. 8 is a flow chart diagram which illustrates operation of a receiver node request handler within the control node in accordance with an exemplary embodiment of the present invention. When an MRN contacts MCN 120 to join a multicast session, the MRN can indicate its capabilities/ requirements. In the preferred embodiment, this is done using the PICS protocol. The MRN specifies its capability/ requirement via the C-label category values. At step 710, MCN 120 examines the MRN capability/requirement indicated in C-label of the MRN join request. At step 715, MCN 120 determines whether there is a suitable MDN to handle the MRN capability/requirement in the MDN tree hierarchy for the requested multicast session. If so, the MRN is assigned to the suitable MDN at step 720. At step 730, the MRN list 437 of the selected MDN in the MDN tree hierarchy 425 of that multicast session (420) in the multicast schedule table (321) is updated to include the MRN. For example, referring to the example in FIG. 4(*d*), if MRN5 with a low bit rate capability of 14K b/sec requests to join the multicast session with a MDN tree hierarchy given in FIG. 4(*d*), MCN 120 assigns MRN5 to MDN4. MRN list field 455 of MDN4 is updated to include MRN5. At step 745, an MRN assignment message is sent to the selected MDN to inform the MDN that the MRN is assigned to it for the multicast session. At step 725, MCN 120 selects an additional MDN from the MDN table to handle the specific capabilities/requirement of the requesting MRN and assigns the MRN to this MDN. At step 735, MDN record 430 representing the MDN is added into the MDN tree hierarchy 425 of that multicast session in the multicast schedule table 321. In the MDN table, the corresponding schedule list 409 of the MDN is also updated to reflect that the MDN is now participating in this multicast session. In the MDN node record 430 of this newly added MDN, MRN list 437 is updated to include the MRN node assigned to it. MCN 120 also notifies the parent node (in the MDN tree hierarchy) of the newly inserted MDN on the change of the hierarchy so that appropriate update can be made on session table 347 of the parent node.

For example, again referring to FIG. 4(*d*), if MRN9 with a bit rate capability of 28K b/sec requests to join the multicast, MCN 120 can add another MDN (say MDN9) to handle that bit rate. It can insert MDN9 as a child node to MDN7. The next level field 473 of MDN7 now points to MDN9. MDN9 performs the conversion from a bit rate of 56K b/sec to 28K b/sec. Its MRN list includes MRN9.

Those skilled in the art will appreciate that the MRN can join the multicast at any time even during the multicast. If there is no MDN available to handle the MRN (either due to capacity or capability), a new MDN can be added to the MDN tree hierarchy dynamically.

Figure 9:
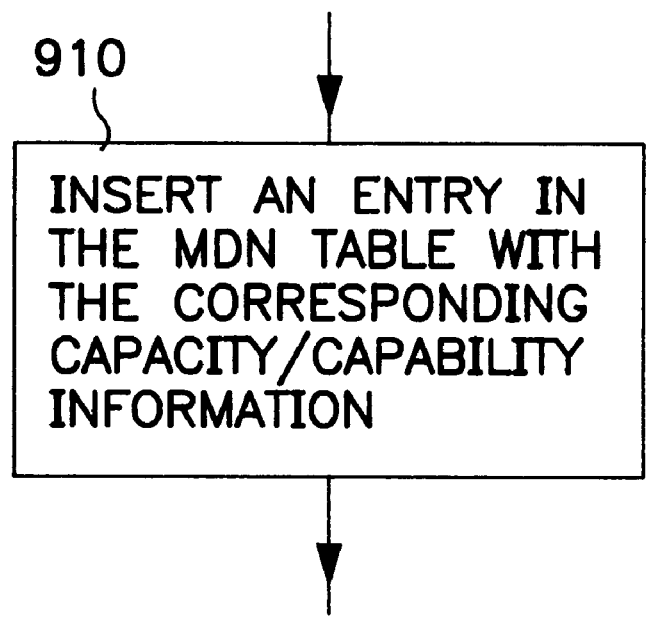
FIG. 9 is a flow chart diagram which illustrates the operation of the distribution node request handler routine of FIG. 3 in accordance with an exemplary embodiment of the present invention.

FIG. 9 is a flow chart diagram which illustrates the operation of the distribution node request handler routine of FIG. 3 in accordance with an exemplary embodiment of the present invention. Any MDN can register its capacity/capability with MCN 120 when execution of the MDN begins. This information may include processing power, I/O bandwidth, memory, and any other specialized functions (e.g., MPEG hardware support, file system, etc.). At step 910, MCN 120 adds an additional entry in MDN table 319 for that MDN. FIG. 4(*a*) provides a detailed illustration of the MDN table. The capacity/capability information is included in the capacity/capability field 407 of the MDN entry.

Figure 10:
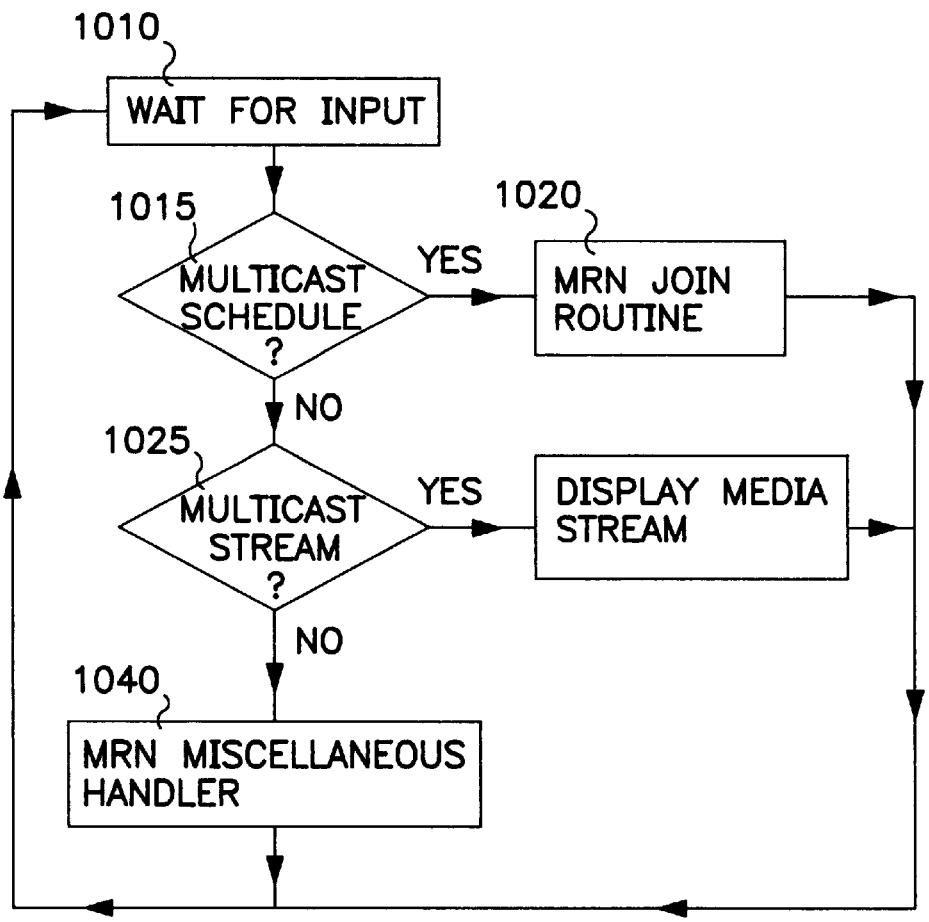
FIG. 10 is a flow chart diagram which illustrates the operation of the receiver node logic of FIG. 3 in accordance with an exemplary embodiment of the present invention.

FIG. 10 is a flow chart diagram which illustrates the operation of MRN logic 337 in accordance with an exemplary embodiment of the present invention. At step 1010, MRN waits for input. At step 1015, depending upon the input received, different actions are taken. If the input received is a multicast schedule, at step 1020, the MRN join routine is invoked. A detailed example of the MRN join routine is described with reference to FIG. 11. At step 1025, if the input received is the multicast stream, MRN processes and displays the media stream at step 1030. At step 1040, MRN miscellaneous handler is invoked to handle other types of input, such as an E-mail requests.

Figure 11:
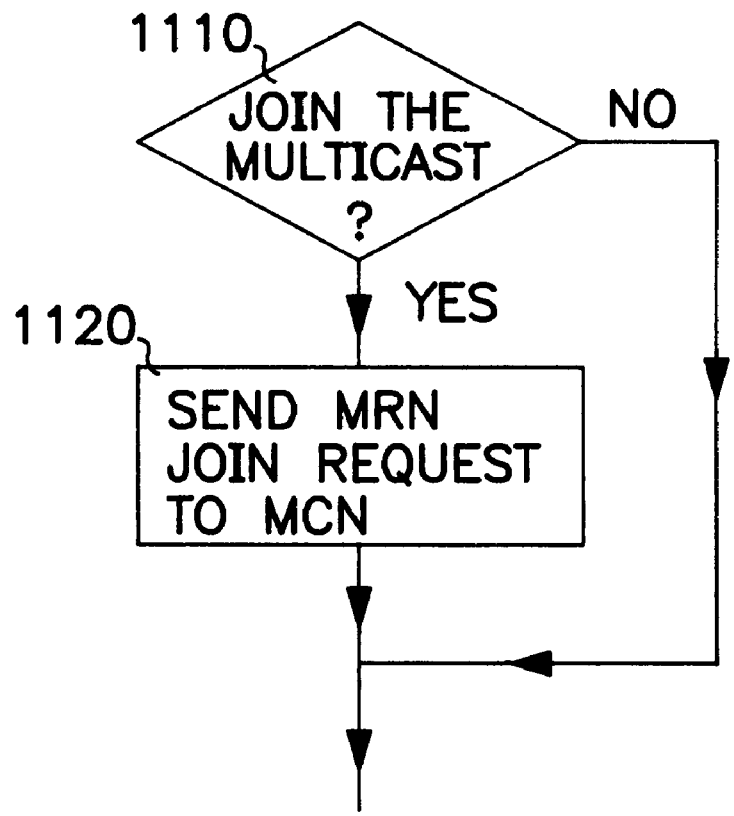
FIG. 11 is a flow chart diagram which illustrates the receiver node join routine of FIG. 10 in accordance with an exemplary embodiment of the present invention.

FIG. 11 is a flow chart diagram which illustrates the receiver node join routine of FIG. 10 in accordance with an exemplary embodiment of the present invention. After reviewing the multicast schedule received from MCN advertisements (described above), if at step 1110, MRN decides to join the multicast, it sends an MRN join request to MCN 120 to indicate it will participate in the multicast at step 1120.

In the preferred embodiment, the MDN maintains a session table 347. FIG. 12 depicts an example of the session table 347. Each entry in the session table consists of several fields, including session ID 1310, session information 1315, start time 1320, duration 1325, MSNID 1330 of multicast source, transformation requirement 1335, and the multicast list 1340. For each session that the MDN participates, an entry is added to the session table to describe the relevant information on the session. As described in detail in FIG. 6, each time an MDN is assigned to a multicast session as part of the MDN tree hierarchy, MCN 120 sends a session configuration message to the MDN with the relevant information to fill out the various fields 1315, 1320, 1325, 1330 and 1335 except (only partially for) the multicast list field 1340. Session information 1315 includes the characteristics of the multicast stream requirements and other information like anticipated audience size or specific audience authentication. Multicast list 1340 includes not only the MRNs but also its child MDNs for the session, i.e. all nodes receiving the multicast session from this MDN. Only the child MDNs are desirably included in the multicast list initially. Later when MCN 120 assigns additional MRNs to the MDN, it notifies the MDN (through an MRN assignment message as depicted in FIG. 8) and the MDN updates multicast list 1340 accordingly.

Figure 13:
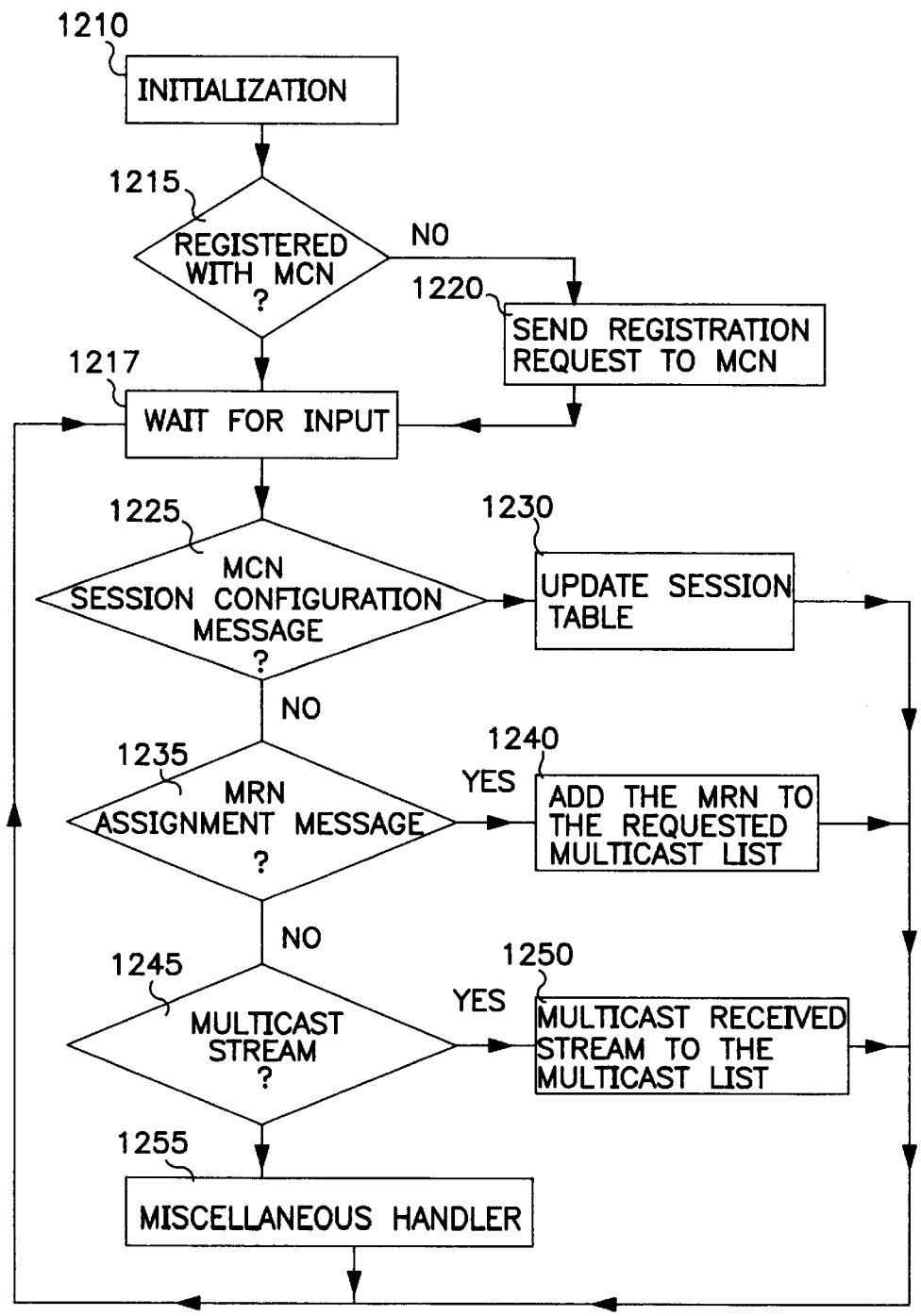
FIG. 13 is a flow chart diagram which illustrates the operation of the distribution node logic of FIG. 3 in accordance with an exemplary embodiment of the present invention.

FIG. 13 is a flow chart diagram which illustrates the operation of MDN logic 345 shown in FIG. 3. At step 1210, MDN performs initialization to bring up the MDN process. At step 1215, if the MDN is not yet registered with MCN 120, a registration request is sent to the MCN at step 1220. The registration request informs the MCN that the node can participate as an MDN to support multicast. Also included in the registration message is the MDN capacity/capability. FIG. 9 illustrates in detail the MDN request handler of the MCN. At step 1217, MDN waits for input. At step 1225, depending upon the input received, different actions are taken. If the input received is a session configuration message from the MCN, at step 1230 the MDN updates session table 347 to add a new session entry with the corresponding information from the session configuration message to fill out the session ID 1310, session information 1315, start time 1320, duration 1325, MSN ID 1330 of the multicast source, the transformation requirement 1335, and the multicast list 1340. The multicast list 1340 includes the child MDN nodes in the MDN tree hierarchy for the session. The MRNs receiving the multicast from this MDN are added later when the MRN assignment message is received as described next. At step 1235, if the input received is an MRN assignment message from the MCN, at step 1240, the MRN is added to the multicast list 1340 of the requested session. At step 1245, if the input received is the multicast stream, MDN multicasts the stream to all MDNs and MRNs in the multicast list of the corresponding multicast session in the session table 347. At step 1255, a miscellaneous handler may be executed.

Figure 14:
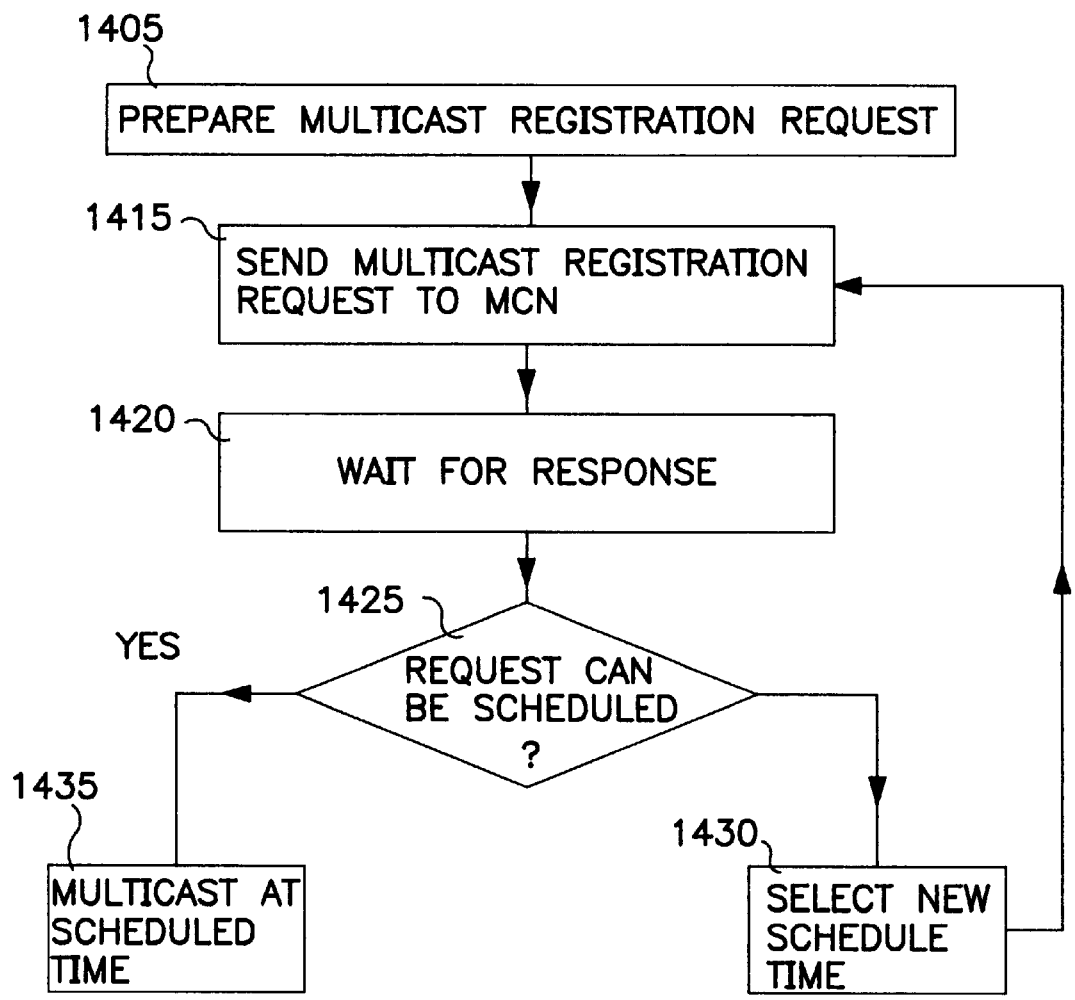
FIG. 14 is a flow chart diagram which illustrates the operation of the source node logic of FIG. 3 in accordance with an exemplary embodiment of the present invention.

FIG. 14 is a flow chart diagram which illustrates the operation of MSN logic 335 shown in FIG. 3. At step 1405, MSN1 100 prepares a multicast registration request to the MCN 120. The multicast registration request specifies the various information related to the multicast session requested. As mentioned before, the MSN registration request specifies the start time, duration, characteristics of the multicast stream, transform version requests, and other information like anticipated audience size or specific audience authentication requirements. At step 1415, MSN sends the registration request to the MCN to register for a multicast session. At step 1420, the MSN waits for the MCN response. At step 1425, if the MCN response indicates that the multicast request can be scheduled, the MSN proceeds with the multicast at the scheduled time at step 1435. Otherwise, at step 1430, the MSN selects a new schedule time.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of multicasting a multimedia stream, comprising the steps of:
   receiving a request to perform a multicast;
   assigning a plurality of distribution nodes to provide said multicast to a plurality of receivers, an assignment of at least one of said nodes based upon transformation capability of said node;
   performing said multicast;
   performing a transformation of said multicast at said node;
   distributing said transformed multicast to at least one receiver which is suitable for receiving said transformed multicast.

2. A method of multicasting a multimedia stream according to claim 1, further comprising the step of receiving from a multimedia stream source a request for said transformation to be performed.

3. A method of multicasting a multimedia stream according to claim 1, wherein said multimedia stream includes multiple components, further comprising the step of providing each of said components to a respective type of receiver.

4. A method of multicasting a multimedia stream according to claim 1, wherein said multimedia stream includes at least one of an audio stream and a video stream.

5. A method of multicasting a multimedia stream according to claim 3, wherein each of said components is distributed to each respective type of receiver through a respective multicast path.

6. A method of multicasting a multimedia stream according to claim 1, further comprising the step of indicating by said at least one receiver its receiving capability.

7. A method of multicasting a multimedia stream according to claim 6, wherein said receiver is pointed to said node responsive to said receiver indicating its receiving capability.

8. A method of multicasting a multimedia stream according to claim 6, wherein said receiver indicates its receiving capability using PICS.

9. A method of multicasting a multimedia stream according to claim 6, wherein said node indicates its ability to perform said transformation.

10. A method of multicasting a multimedia stream according to claim 1, further comprising the step of receiving from said receiver a request to join said multicast after a plurality of additional receivers have already begun to receive said multicast.

11. An apparatus for multicasting a multimedia stream, comprising:
    a source node for requesting a multicast;
    a plurality of distribution nodes for distributing said multicast, at least one of said nodes capable of transforming said multicast;
    a plurality of receivers; and
    a control node for assigning said plurality of said distribution nodes to provide said multicast to said plurality of receivers based upon transformation capability of at least one of said nodes.

12. An apparatus for multicasting a multimedia stream according to claim 11, further comprising a source node for providing said multimedia stream and for requesting said transformation to be performed.

13. An apparatus for multicasting a multimedia stream according to claim 11, wherein said multimedia stream includes multiple components and each of said components are receivable by a respective type of said plurality of receivers.

14. An apparatus for multicasting a multimedia stream according to claim 11, wherein said multimedia stream includes at least one of an audio stream and a video stream.

15. An apparatus for multicasting a multimedia stream according to claim 13, wherein each of said components is distributed to each respective type of receiver through a respective multicast path.

16. An apparatus for multicasting a multimedia stream according to claim 11, wherein at least one of said receivers indicates its receiving capability.

17. An apparatus for multicasting a multimedia stream according to claim 16, wherein said receiver is pointable to said node responsive to said receiver indicating its receiving capability.

18. An apparatus for multicasting a multimedia stream according to claim 16, wherein said receiver indicates its receiving capability using PICS.

19. An apparatus for multicasting a multimedia stream according to claim 16, wherein at least one of said nodes indicates its ability to perform said transformation.

20. An apparatus for multicasting a multimedia stream according to claim 11, wherein said receiver is permitted to join said multicast after a plurality of additional receivers have already begun to receive said multicast.

\* \* \* \* \*

UNITED STATES PATENT AND TRADEMARK OFFICE
CERTIFICATE OF CORRECTION

PATENT NO. : 5,940,391
DATED : August 17, 1999
INVENTOR(S) : Malkin, et. al.

It is certified that error appears in the above-identified patent and that said Letters Patent is hereby corrected as shown below:

On the Cover Page, item [56], under OTHER PUBLICATIONS,
"Jan. 1929-31, 1996." should be corrected to read -- Jan. 29-31, 1996 -- .

Signed and Sealed this

Seventh Day of March, 2000

Attest:

Attesting Officer

Q. TODD DICKINSON

Commissioner of Patents and Trademarks